Nov. 1, 1955          C. J. BUZZETTI ET AL          2,722,587
                   ELECTRIC STRAIN SENSING DEVICE
Filed March 20, 1953                              2 Sheets-Sheet 1
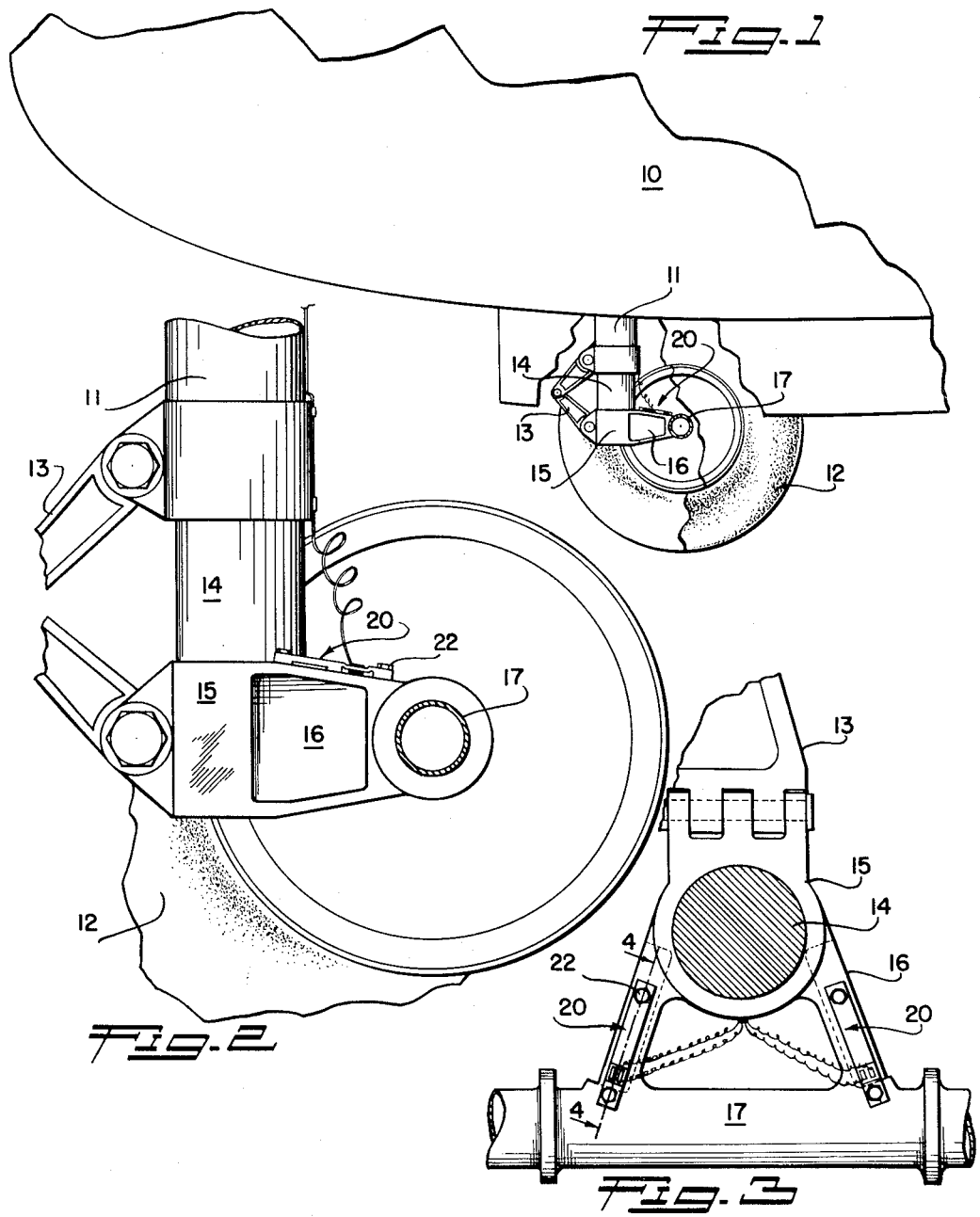
INVENTORS
CHARLES J. BUZZETTI
WALTER L. HOWLAND
By George C. Sullivan
    Agent

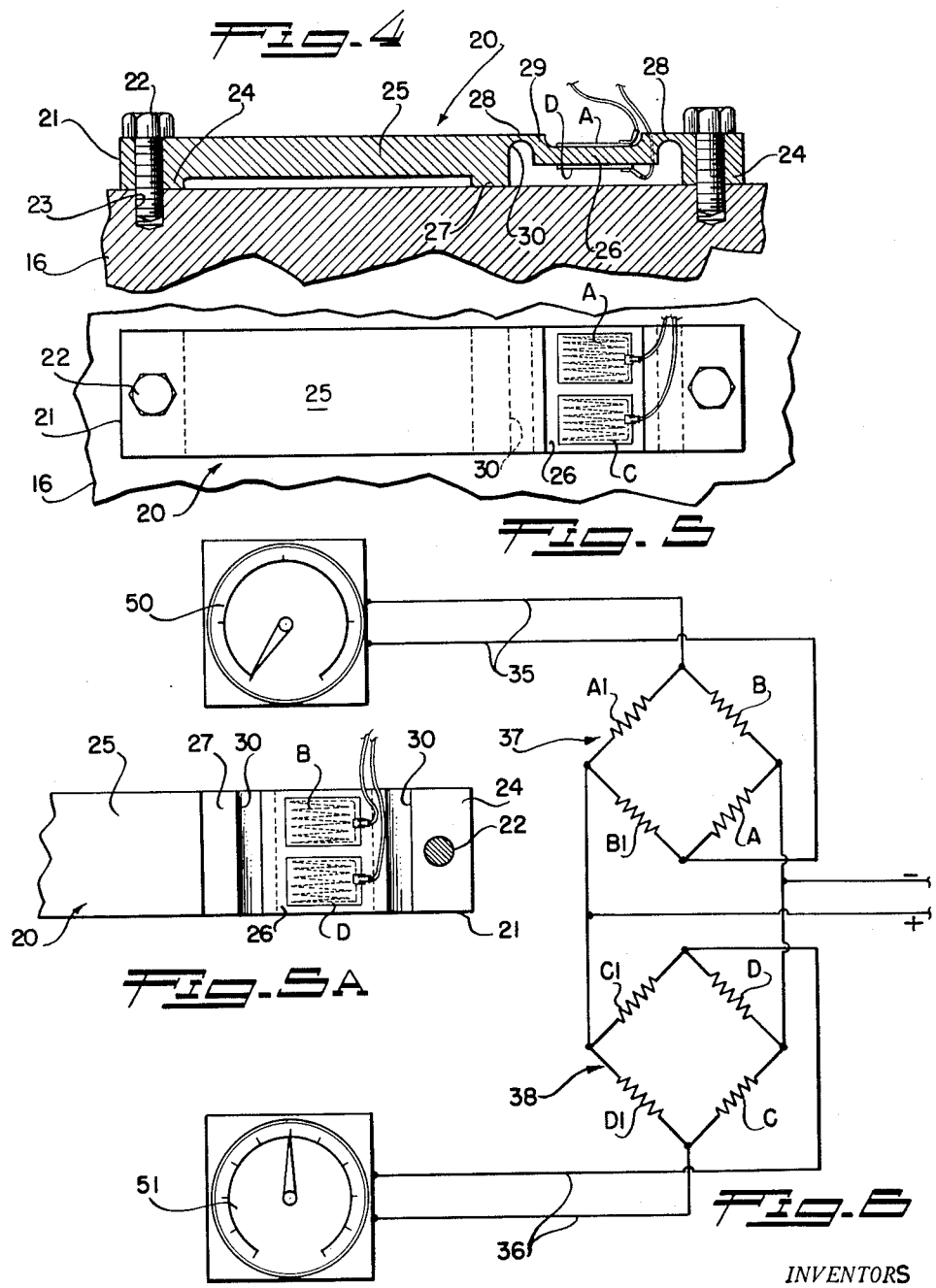

United States Patent Office 2,722,587
Patented Nov. 1, 1955

2,722,587

ELECTRIC STRAIN SENSING DEVICE

Charles J. Buzzetti, Sepulveda, and Walter L. Howland, Pasadena, Calif., assignors to Lockheed Aircraft Corporation, Burbank, Calif.

Application March 20, 1953, Serial No. 343,716

10 Claims. (Cl. 201—63)

This invention relates to the sensing and measuring of mechanical loads and relates more particularly to transducers useful in sensing and measuring strains and variations in strains in a body.

Strain gauges of the type having a fine electrical resistance wire bonded to a member subject to strain whereby variation in the strain or load in the member are reflected by resistance changes in the wire are known and are in extensive use. It has been the general practice to bond such gauges directly to the member and in order to sense say either a compressive strain or a tensile strain, it has been necessary to employ one or more gauges arranged axially in the direction of the force or load and one or more gauges arranged with their longitudinal axes transverse of the direction of the load. Although such electrical strain gauges are relatively sensitive, there are many situations where the structural members to which the gauges are to be applied must be constructed and/or proportioned to normally carry the load to be sensed or measured with a minimum of deflection so that the signals produced by the gauges as a result of variations in the load are of small magnitude. There are also situations where the strain gauges, which are of necessity rather delicate and which must be carefully calibrated before use, are subjected to the elements or liable to be damaged or broken as an incident of the normal use of the device or mechanism to which they are applied. The gauges are usually bonded to the structural member by Glyptal or similar material and in the event a gauge is broken or damaged considerable time and expense are involved in removing the gauge, in calibrating a new gauge and then applying or bonding the new gauge to the member and making the necessary electrical connections with its circuit.

It is a general object of the present invention to provide a simple practical electrical strain sensitive transducer or device having a high degree of sensitivity and accuracy and that may be easily and quickly installed and if necessary replaced in the field.

Another object of the invention is to provide a transducer or strain sensitive gauge means constructed in such a manner as to concentrate and multiply the strain being sensed in a region of the device or transducer to which the strain sensitive electrical gauges are applied or bonded so as to produce therein variations of resistance of substantial magnitude and thereby obtain signals or indications of substantial magnitude even with only relatively small variations in the strain or load being sensed. This strain concentrating and multiplying action of the device well suits it for uses or applications where the sensing and measuring of load and strain variations may be difficult with the conventional manners of applying and utilizing strain gauges.

Another object of the invention is to provide an electrical strain transducer of this kind that may be constructed as a unit incorporating one or more strain gauges accurately calibrated in the factory or place of manufacture and easily secured in the operative position on the structural member in such a manner that it may be readily removed, if damaged, to be quickly replaced by an identical or like transducer likewise accurately calibrated at the time of manufacture. This feature particularly suits the devices for application to mechanisms that are in daily use where the strain sensitive devices may be broken or damaged and where the withdrawal of the machine from normal use in order to replace the transducer even for limited periods may be costly.

A further object of the invention is to provide a strain gauge device or transducer of the character mentioned wherein the above referred to strain concentrating and multiplying action makes it unnecessary to employ strain gauges arranged transversely of the direction of the strain being sensed. In practice the device may be effectively employed with only one electrical strain gauge arranged with its strain sensing resistance wire extending longitudinally in the direction of the load or strain to be sensed and in other cases two or more such gauges may be applied in a similar manner to the opposite surfaces of the beam section wherein the sensed strain is concentrated.

Other objectives and features of the invention will become apparent from the following detailed description of a typical preferred form and application of the invention throughout which description reference will be made to the accompanying drawings wherein:

Figure 1 is a fragmentary side elevation of an aircraft illustrating a transducer of the invention applied to a landing gear thereof;

Figure 2 is an enlarged side elevation of the landing gear with the transducer thereon;

Figure 3 is a plan view of a portion of the landing gear showing the transducers of the invention secured to channel sections thereof;

Figure 4 is an enlarged fragmentary vertical detailed sectional view taken as indicated by line 4—4 on Figure 3;

Figure 5 is an enlarged plan elevation of the transducer illustrated in Figure 4;

Figure 5A is a fragmentary bottom view of the transducer; and

Figure 6 is a wiring diagram of a typical circuit in which the transducers may be incorporated.

The strain sensing devices or transducers of the invention are of course useful in many situations and on machines, structures and instrumentalities varying greatly in character. In order to facilitate an understanding of the invention we have herein shown in the accompanying drawings two typical devices of the invention secured to the nose wheel landing gear of an airplane and will describe the invention in association with the landing gear. It is to be understood that this is merely one typical application of the invention and the invention is not to be construed as limited either in scope or usefulness to the illustrative embodiment and application herein disclosed.

The portion of the airplane illustrated includes the fuselage 10, a landing gear strut 11, and landing wheels 12. The strut 11 which may be of the oleo type is equipped with the conventional scissors arrangement 13 connected between the strut and its piston 14. The lower end of the scissors arrangement 13 is connected with a member 15 secured on the lower end of the piston 14 and this member 15 has two channel sections 16 diverging rearwardly to carry the axle 17 for the two wheels 12. The present invention is not primarily concerned with the details of the landing gear per se although it may be noted that the individual channel sections 16 carry loads which are proportional to the total load on the nose gear when the aircraft is on the field or ground. In the drawings we have shown a device or transducer 20 of the invention replaceably secured to the upper side of each channel section 16 to sense or measure the loads on the sections. As the two transducers 20 may be identical we will proceed with a description of one of them it being understood that this description is equally applicable to the other.

The transducer of the invention includes a strip-like body 21 of steel or the equivalent adapted to be removably and replaceably secured on a surface of its channel section 16 of the landing gear. The body 21 is an elongate part of generally rectangular cross-section which may have flat parallel longitudinal margins and plain flat ends. In accordance with the invention each end portion of the body 21 is rigidly and yet removably secured to the channel section 16. In the typical preferred arrangement illustrated bolts or screws 22 pass through openings in the end portions of the body 21 and screw thread into openings 23 in the section 16 to attach the body to the section. The under side of the body 21 has bosses or raised lands 24 at its opposite end portions and the screws 22 serve to tightly clamp these lands against the surface of the section 16. The surfaces of the lands 24 may simply be machined to flatly conform to and clamp on the surface of the section 16. However, if the desired surfaces of the lands 24 may be roughened or made rough to assist the screws 22 in preventing relative movement between the body 21 and the section 16 during flexure or deflection of the section.

In accordance with the invention the body 21 is relatively long to receive the average strain over a substantial or considerable portion of the channel section 16 and is constructed to have a heavy relatively unyielding beam portion 25 and a shorter more readily deflected arm portion or beam portion 26. As best illustrated in Figure 4 the inner or under side of the body 21 has a projecting area or land 27 which bears on the surface of the structural part or channel section 16. This land 27 which is free to move with respect to the section 16 upon deflection of the same is at one extremity of the beam portion 25 and the more yieldable beam portion 26 is between the land 27 and the nearest or adjacent land 24. Although the relative lengths of the two beam portions 25 and 26 may vary in different forms and applications of the invention it will be seen that in the case illustrated the more unyielding beam portion 25 is several times longer than the beam portion 26.

The above mentioned shorter arm region or beam section 26 is constructed and arranged to be loaded in bending, assuming the part or channel section 16 to be under load or variable load. As best illustrated in Figure 4 there are flexure sections or regions 28 of reduced cross-sectional area connected with the ends of the short beam section 26 by lever arm regions 29 of greater cross-sectional area. Although the body 21 of the transducer may be sectional, that is fabricated from two or more pieces, it will usually be preferred to construct it of one length or piece of metal, machined or otherwise formed to have the two beam sections 25 and 26, the flexural regions 28, the lever arm regions 29, and the lands 24 and 27. Thus the flexural regions 28 may be readily provided by machining transverse grooves 30 in the under side of the body 21 adjacent to the roots of the contiguous lands 24 and 27 and the lever regions 29 and the shorter beam section 26 as well as the other parts of the body may also be machined or otherwise provided.

In accordance with the invention the lever regions 29 serve to offset the neutral axis of the beam section 26, that is the central longitudinal axis of the section 26, from the neutral axis of the flexural regions 28 and in the construction illustrated the neutral axis of the beam section 26 is offset inwardly, that is toward the structural part or channel section 16. The construction is such that variations in load on the part or channel 16 produce rotation of the lever arm regions 29 about the axes of the flexural regions 28 which in turn causes bending deflection of the beam section 26. It will be seen that rotation of the lever arm regions 29 accompanying flexure at the regions 28 effects a definite mechanical advantage and together with the concentration of the average strain, occurring over the length of the body 21, in the short beam section 26 gives an effective and substantial strain multiplying action. In the preferred construction where the neutral axis of the short beam region 26 is offset inwardly or toward the channel section 16 the land 27 bearing inwardly against the surface of the section 16 effectively resists any tendency for the transducer body 21 to deflect outwardly by reason of the strain multiplying action of the lever arm regions 29.

The shorter beam section 26 of the transducer is designed or intended to carry one or more strain gauges of the general type herein above referred to, the section 26 having plain flat upper and lower surfaces for receiving the gauges. Practically any selected or required number of strain gauges may be arranged on the deflectible beam section 26. For example if desired a single gauge may be secured on one surface, say the under surface of the section 26. In the typical illustrative example herein disclosed there are two strain gauges on each side or surface of the beam section 26, one gauge on each side being connected in one output circuit and the other gauges being connected in a second output circuit, this being only one typical manner of applying or utilizing the invention. Thus referring to Figures 5 and 5A it will be seen that the upper side of the transducer carries gauges A and C while the lower side of the transducer carries strain gauges B and D. The strain responsive wires of the gauges are suitably insulated and the gauges themselves are appropriately cemented or bonded to the surfaces of the beam section 26 with Glyptal or any other appropriate cement adapted to secure and seal the strain gauges. In Figure 6 we have illustrated one typical manner of connecting the strain gauges in Wheatstone bridge circuits associated with two output circuits 35 and 36. The gauges A and B are connected in contiguous branches of one Wheatstone bridge 37 while the gauges C and D are connected in contiguous branches of the second bridge circuit 38, the bridge circuit 37 being connected in the output circuit 35 to provide the indications or signals therefor and the bridge circuit 38 being connected in the output circuit 36 to provide the variable indications for that circuit, the output circuits leading to suitable indicating and/or recording devices 50 and 51 respectively. Where, as in the presently illustrated application of the invention, there are two transducers associated with the same structure or landing gear the strain gauges of the second transducer may be connected in the same Wheatstone bridges 37 and 38. In Figure 6 the strain gauges of the second transducer are designated A1, B1, C1 and D1 respectively and it will be seen that these gauges are connected in the branches of the Wheatstone bridges 37 and 38 to be opposite to the corresponding gauges A, B, C, and D respectively of the first transducer.

It is believed that the features and operation of the transducers of the invention will be readily understood from the foregoing detailed description. The strain gauges A to D inclusive and A1 to D1 inclusive may be accurately calibrated at the time of manufacture of the transducers and the transducers are easily and quickly installed in the operative positions on the structural parts. Furthermore in the event of damage to or malfunctioning of a transducer it may be readily detached by merely removing the screws 22 and a new or replacement transducer carrying pre-calibrated strain gauges is then secured in position by the screws. The replacement of the transducers is easily accomplished in a brief time and with simple tools. As above described the transducers are constructed to multiply the strains or variations in strains applied thereto to give accurate signals or indications of substantial magnitude. Considering now one of the transducers 20, the average strain or the average variation in strain in the region of the structural part 16 between the screws 22 is applied to the transducer body 21. This strain or these variations are concentrated in the short readily deflectible beam section 26 and are increased or multiplied by the moment arm action of the lever arm regions 29 which rotate about the axes of the flexural regions 28. Accordingly the beam section 26 is deflected a substantial amount even in response to relatively small magnitude variations in the strain in the part or channel section 16. The bending or deflection of the beam section 26 is sensed by the strain gauges, the electrical resistance thereof being influenced or changed by the tensile stresses in the outer side of the section 26 and the compression stresses in the inner side of the section. The signals or indications thus produced are impressed on the bridges 37 and 38 or other suitable electrical system which of course may be connected with any type of selected or required indicating and/or recording mechanism. While the transducers of the invention are shown associated with the structural parts or channels 16 subjected to bending loads when in use or operation the transducers are equally well adapted for use on structural parts or the like for carrying axial loads to be under compression or tension.

Having described only a typical preferred form and application of the invention we do not wish to be limited to the specific details herein set forth but wish to reserve to ourselves any features or modifications that may fall within the scope of the following claims.

We claim:

1. A strain sensing device of the class described comprising an elongate body, means for transmitting a load to be measured to opposite end portions of the body to subject the body thereto, the body including a major longitudinally extending portion substantially unyielding to resist deflection by said load, and a longitudinally extending minor portion of smaller cross sectional area than said major portion to be deflectable by said load, said portions being connected and related so that each of them is subjected to the entire load transmitted to the body, and strain gauge means on said minor body portion sensitive to deflection thereof.

2. A strain sensing device comprising an elongate body, means at points spaced longitudinally of the body for transmitting a load to the body, the body including two longitudinally extending portions between said points, said portions being connected one to the other to each transmit said entire load, one portion extending the major distance between said points and being proportioned to be substantially unyielding to resist deflection by said load, the other extending only a minor portion of said distance and being smaller in cross section than the first named portion to be deflectable by said load, and a strain gauge on said other portion sensitive to deflection thereof:

3. A strain sensing device comprising a body, means at spaced points on the body transmitting a load to the body, the body including two longitudinally spaced regions of reduced cross sectional area spaced between said points and constituting regions of flexure, a lever region extending from each flexure region to rotate thereabout upon flexure of the same, and a deflectable beam portion of reduced cross sectional area extending between and connected at its ends with said lever regions to be deflected upon said load or variations in said load flexing said regions of flexure, and a gauge means on the beam portion sensing deflection thereof.

4. A strain sensitive device comprising an elongate body, means adjacent the ends of the body for transmitting a load to the body, the body having at least two longitudinally extending portions which each can carry said load in its entirety, one extending for a major part of the length of the body and being of such cross sectional proportions as to be substantially unyielding so as to resist deflection by the load, the other portion extending only a minor part of the length of the body and being of smaller cross sectional proportions to be deflectable by said load, the body further including regions of limited cross sectional area adjacent the ends of said other portion constituting regions of flexure, and a lever arm extending from each region of flexure and connected with the repective adjacent end of said other portion to support said other portion to have its neutral axis offset laterally from the longitudinal plane occupied by the neutral axes of regions of flexure whereby said load and variations thereof in flexing said regions of flexure are multiplied in deflecting said other portion, and strain gauge means on said other portion for sensing deflection thereof.

5. A strain sensitive device comprising a body, means at spaced points on the body transmitting a load to the body, the body including two longitudinally spaced regions of reduced cross sectional area spaced between said points and constituting regions of ready flexure under load, a lever extending from each flexure region to rotate thereabout upon flexure of the same, and a deflectable beam portion of reduced cross sectional area extending between and connected at its ends with said levers to be deflected upon said load or variations in said load flexing said regions of flexure, and strain gauges secured on opposite sides of said beam portion to sense deflection thereof.

6. A strain sensitive device comprising an elongated body, means adjacent the ends of the body for transmitting a load to the body, the body having at least two longitudinally extending portions which carry said load, one extending for a major part of the length of the body and being arranged and proportioned to be substantially unyielding to resist deflection by the load, the other portion extending only a minor part of the length of the body and of reduced cross sectional area relative to the first named portion to be deflectable by said load, the body further including two spaced regions of reduced cross sectional area relative to said first named portion and said other portion to constitute regions of ready flexure, and a lever arm region extending from each region of flxure and connected with an end of said other portion to support said other portion to have its neutral axis offset laterally from the longitudinal plane occupied by the neutral axes of regions of flexure whereby said load and variations thereof in flexing said regions of flexure are multiplied in deflecting said other portion, and strain gauges secured on opposite sides of said other portion for sensing deflection thereof.

7. In combination with the surface of a part carrying a load; an elongate body having lands adjacent its ends, means securing said lands to said surface whereby the body is subjected to the average deflection of the part in the area between the lands, the body including a major longitudinal portion of relatively large cross sectional area to be resistant to deflection, a minor beam portion of smaller cross sectional area than said major portion to be readily deflected, said portions being between the lands to each assume the entire loads imposed on the body and spaced from said surface by the lands, and strain gauge means on the beam portion.

8. In combination with the surface of a part carrying a load; an elongate body having lands adjacent its ends, means securing said lands to said surface whereby the body is subjected to the average deflection of the part in the area between the lands, the body including a major longitudinal portion of large cross sectional area to be resistant to deflection, a minor beam portion of smaller cross sectional area than said major portion to be readily deflected, said portions being between the lands to each assume the entire loads imposed on the body and spaced from said surface by the lands, the body further including spaced regions of less cross sectional area than said beam portion adjacent the opposite ends of said beam portion to constitute regions of ready flexure, and lever arm regions supporting the beam portion on the regions of flexure with its neutral axis offset from the neutral axes thereof, and strain gauge means on the portion for sensing deflection thereof.

9. In combination with the surface of a part carrying a load; an elongate body having lands adjacent its ends, removable screw thread means securing said lands to said surface whereby the body is subjected to the average deflection of the part in the area between the lands, the body including a major longitudinal portion of large cross section to be resistant to deflection, a minor beam portion of smaller cross section than the major portion adapted to be readily deflected, said portions being located between the lands and spaced from said surface by the lands, and strain gauge means on the beam portion.

10. In combination with the surface of a part carrying a load; an elongate body having lands adjacent its ends, screw thread means replaceably securing the lands to said surface whereby the body is subjected to the average deflection of the part in the area between the lands, the body having a readily deflectable beam portion of reduced cross sectional area spaced between the lands, and strain gauge means on the beam portion sensitive to deflection thereof.

References Cited in the file of this patent

UNITED STATES PATENTS

| | | |
|---|---|---|
| 2,231,702 | Burgwin | Feb. 11, 1941 |
| 2,359,245 | Ritzmann | Sept. 26, 1944 |
| 2,416,664 | Ruge | Feb. 25, 1947 |
| 2,460,503 | Howe | Feb. 1, 1949 |
| 2,493,029 | Ramberg | Jan. 3, 1950 |
| 2,522,117 | Holt | Sept. 12, 1950 |
| 2,597,751 | Ruge | May 20, 1952 |
| 2,601,781 | Fillion | July 1, 1952 |